(12) United States Patent
Hickman

(10) Patent No.: US 9,003,308 B2
(45) Date of Patent: Apr. 7, 2015

(54) INTERACTIVE PLACEMENT ORDERING

(75) Inventor: Ryan Hickman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1265 days.

(21) Appl. No.: 12/104,117

(22) Filed: Apr. 16, 2008

(65) Prior Publication Data

US 2009/0265622 A1 Oct. 22, 2009

(51) Int. Cl.
*G06F 17/30* (2006.01)
*G06Q 30/02* (2012.01)
*G06F 17/00* (2006.01)

(52) U.S. Cl.
CPC ...................................... *G06Q 30/02* (2013.01)

(58) Field of Classification Search
None
See application file for complete search history.

(56) References Cited

U.S. PATENT DOCUMENTS

| | | | |
|---|---|---|---|
| 6,708,176 B2 | 3/2004 | Strunk et al. | |
| 6,935,761 B2 | 8/2005 | Vanderschuit | |
| 6,986,030 B2 | 1/2006 | Shmueli et al. | |
| 7,052,154 B2 | 5/2006 | Vanderschuit | |
| 7,231,416 B1 | 6/2007 | Busuioc | |
| 7,299,195 B1 | 11/2007 | Tawakol et al. | |
| 7,536,385 B1 * | 5/2009 | Wolfe ................................. | 1/1 |
| 7,660,792 B2 | 2/2010 | Brewer et al. | |
| 7,778,874 B1 * | 8/2010 | Saunders ................... | 705/14.67 |
| 2001/0018766 A1 | 8/2001 | Morita et al. | |
| 2001/0056370 A1 | 12/2001 | Tafla | |
| 2002/0178232 A1 | 11/2002 | Ferguson | |
| 2003/0055729 A1 * | 3/2003 | Bezos et al. ..................... | 705/14 |
| 2003/0135405 A1 | 7/2003 | Townsend et al. | |
| 2004/0264173 A1 | 12/2004 | Vanderschuit | |
| 2004/0264176 A1 | 12/2004 | Vanderschuit | |
| 2005/0144827 A1 | 7/2005 | Decell, Jr. | |
| 2005/0165615 A1 | 7/2005 | Minar | |
| 2007/0038508 A1 | 2/2007 | Jain et al. | |
| 2007/0067322 A1 | 3/2007 | Harrison, Jr. | |
| 2007/0113167 A1 | 5/2007 | Kundu | |
| 2008/0034329 A1 | 2/2008 | Posner et al. | |
| 2008/0066107 A1 | 3/2008 | Moonka et al. | |
| 2008/0077478 A1 * | 3/2008 | Kim ................................. | 705/10 |
| 2008/0091535 A1 | 4/2008 | Heiser, II et al. | |
| 2009/0055755 A1 | 2/2009 | Hicks et al. | |
| 2010/0017737 A1 | 1/2010 | Berger | |
| 2010/0036740 A1 | 2/2010 | Barashi | |
| 2011/0289531 A1 | 11/2011 | Moonka et al. | |

FOREIGN PATENT DOCUMENTS

| | | |
|---|---|---|
| KR | 2002/0012326 | 2/2002 |
| KR | 10-0705474 B1 | 4/2007 |
| WO | 01/82178 A2 | 11/2001 |

OTHER PUBLICATIONS

PCT International Search Report and the Written Opinion, PCT/US2009/040694, Oct. 27, 2009, 11 pages.

(Continued)

*Primary Examiner* — Keith Bloomquist
(74) *Attorney, Agent, or Firm* — Fish & Richardson P.C.

(57) ABSTRACT

Methods, systems, and apparatus, including computer program products, in which syndication spaces for a webpage are identified, each syndication space defining a location on the webpage in which one or more content items are displayed at a client device, and each syndication space is associated with one or more attributes. One or more of the attributes are selectively displayed on the webpage at the client device.

18 Claims, 6 Drawing Sheets

(56) References Cited

OTHER PUBLICATIONS

PCT/US2009/040697 International Search Report, Nov. 24, 2009, 12 pages.
PCT/US2009/040703 International Search Report, Nov. 25, 2009, 11 pages.
U.S. Appl. No. 12/104,040, filed Apr. 16, 2008, Ryan Hickman.
U.S. Appl. No. 12/104,079, filed Apr. 16, 2008, Ryan Hickman.
Examination Report in Australian Application No. 2009236224, dated Dec. 17, 2013, 3 pages.
Examination Report in Australian Application No. 2009236231, dated Dec. 18, 2013, 3 pages.
Examination Report in Australian Application No. 2009236226, dated Apr. 26, 2014, 3 pages.

* cited by examiner

INTERACTIVE PLACEMENT ORDERING

BACKGROUND

This document relates to information presentation.

The rise of the Internet has enabled access to a wide variety of content items, e.g., video and/or audio files, webpages for particular subjects, news articles, etc. Such access to these content items has likewise enabled opportunities for targeted advertising. One form of online advertising is advertisement syndication, which allows advertisers to extend their marketing reach by distributing advertisements to additional partners. For example, third party online publishers can place an advertiser's text or image advertisements on webpages that have content related to the advertisement. As the users are likely interested in the particular content on the publisher webpage, they are also likely to be interested in the product or service featured in the advertisement. Accordingly, such targeted advertisement placement can help drive online customers to the advertiser's webpage.

SUMMARY

An advertiser or publisher may be interested in reviewing syndication spaces, e.g., advertising slots, on various web properties to evaluate the syndication spaces and/or the web property and place a bid to enter an auction associated with the syndication spaces.

In general, one aspect of the subject matter described in this specification can be embodied in a method for receiving attribute input data associated with an advertisement. A syndication space can be identified for a webpage, the syndication space defining a location on the webpage in which one or more advertisements are displayed at a client device, and the syndication space is associated with one or more attributes. Product display data can be generated that causes the syndication space to selectively display a visual indication of one or more of the attributes on a webpage of a publisher at the client device. The display data can be provided to the client device. A selection of an attribute can be received from the client device, and an attribute interface can be provided in response to a selection of the attribute. Attribute input data associated with an advertisement from the attribute interface can be received to be associated with the location on the webpage. Other embodiments of this aspect include corresponding methods, apparatus, and computer program products.

Another aspect of the subject matter described in this specification can be embodied in a method for displaying an attribute interface. An identifier of a syndication space associated with a webpage can be received, the syndication space defining a location on the webpage in which one or more advertisements are displayed at a client device when the webpage is displayed on the client device, and wherein the syndication space is associated with one or more attributes. A visual indication of the attribute can be selectively displayed in response to a user selection. User selection of the attribute can be received, and an attribute interface can be displayed in response to the user selection of the attribute, wherein the attribute interface is used to receive attribute input data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
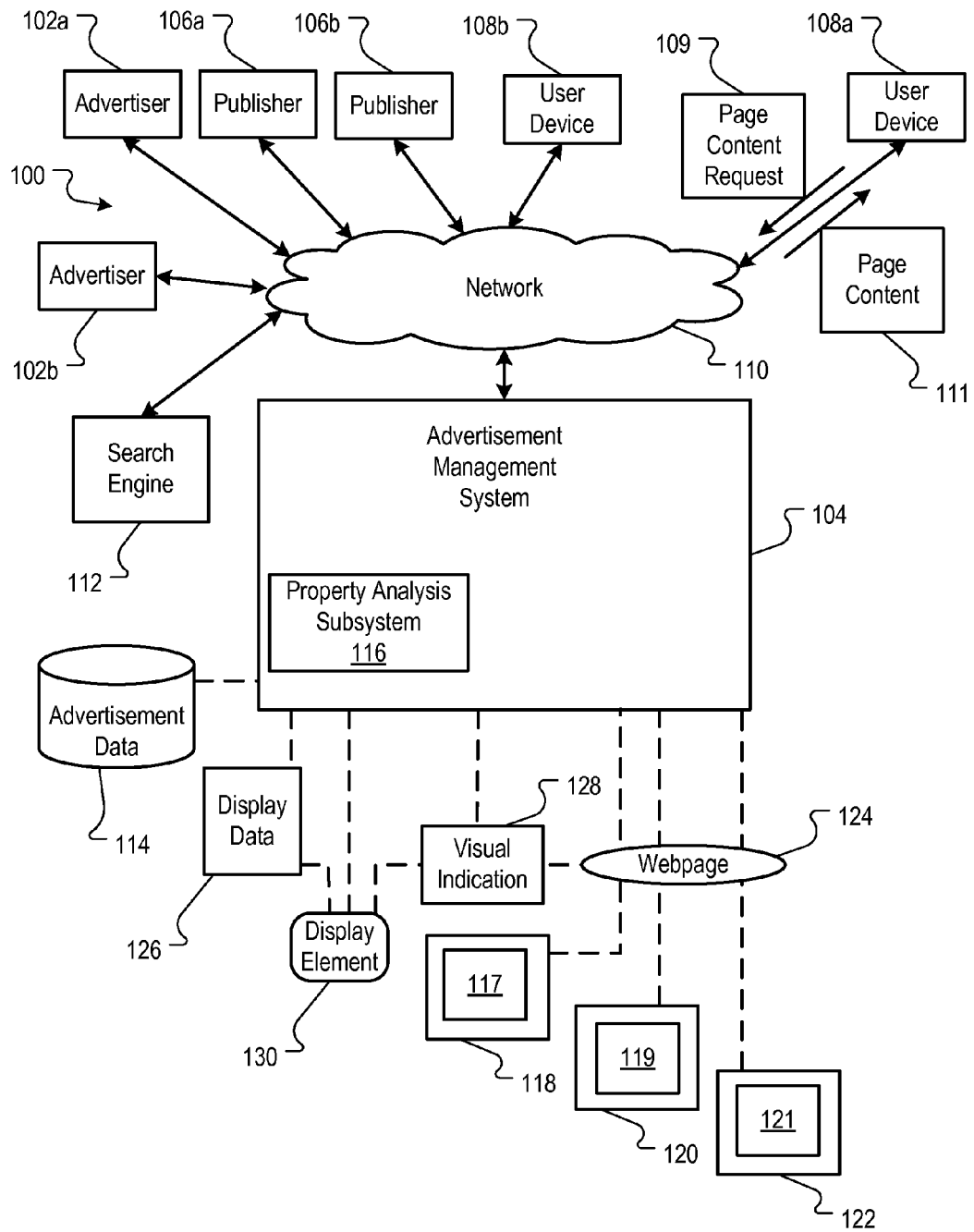
FIG. 1 is a block diagram of an example online environment.

FIG. 1 is a block diagram of an example online environment 100. The online environment 100 can facilitate the identification and serving of content items, e.g., webpages, advertisements, etc., to users. A computer network 110, such as a local area network (LAN), wide area network (WAN), the Internet, or a combination thereof, connects content providers (e.g., advertisers 102a and 102b), an advertisement management system 104, publishers 106a and 106b, user devices 108a and 108b, and a search engine 112. Although only two advertisers (102a and 102b), two publishers (102a and 102b) and two user devices (108a and 108b) are shown, the online environment 100 may include many thousands of advertisers, publishers and user devices.

§1.0 Advertisement Publishing And Tracking

In some implementations, one or more advertisers 102a and/or 102b can directly, or indirectly, enter, maintain, and track content item information in the advertising management system 104. One form of a content item is an advertisement. Other forms of content items can include video files, image files, and audio files. While the description below refers to advertisements, other forms of content items can also be used. The advertisements can be in the form of graphical advertisements, such as banner advertisements, text only advertisements, image advertisements, audio advertisements, video advertisements, advertisements combining one or more of any of such components, etc., or any other type of electronic advertisement document 120. The advertisements may also include embedded information, such as a links, meta-information, and/or machine executable instructions, such as HTML or JavaScript™.

A user device, such as user device 108a, can submit a page content request 109 to a publisher or the search engine 112. In some implementations, the page content 111 can be provided to the user device 108a in response to the request 109. The page content can include advertisements provided by the advertisement management system 104, or can include executable instructions, e.g., JavaScript™, that can be executed at the user device 108a to request advertisements from the advertisement management system 104. Example user devices 108 include personal computers, mobile communication devices, television set-top boxes, etc.

Advertisements can also be provided from the publishers 106. For example, one or more publishers 106a and/or 106b can submit advertisement requests for one or more advertisements to the system 104. The system 104 responds by sending the advertisements to the requesting publisher 106a or 106b for placement on one or more of the publisher's web properties (e.g., webpages and other network-distributed content).

The advertisements can include embedding links to landing pages, e.g., pages on the advertisers' 102 webpages, that a user is directed to when the user clicks an advertisement presented on a publisher webpage. The advertisement requests can also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, a publisher 106 can combine the requested content with one or more of the advertisements provided by the system 104. This combined page content 111 and advertisements can be sent to the user device 108 that requested the content (e.g., user device 108a) as page content 111 for presentation in a viewer (e.g., a browser or other content display system). The publisher 106 can transmit information about the advertisements back to the advertisement management system 104, including information describing how, when, and/or where the advertisements are to be rendered (e.g., in HTML or JavaScript™).

Publishers 106a and 106b can include general content servers that receive requests for content (e.g., articles, discussion threads, advertisements, music, video, graphics, search results, webpage listings, information feeds, etc.), and retrieve the requested content in response to the request. For example, content servers related to news content providers, retailers, independent blogs, social network sites, or any other entity that provides content over the network 110 can be a publisher.

Advertisements can also be provided through the use of the search engine 112. The search engine 112 can receive queries for search results. In response, the search engine 112 can retrieve relevant search results from an index of documents (e.g., from an index of webpages). An exemplary search engine 112 is described in the article S. Brin and L. Page, "The Anatomy of a Large-Scale Hypertextual Search Engine," Seventh International World Wide Web Conference, Brisbane, Australia and in U.S. Pat. No. 6,285,999. Search results can include, for example, lists of webpage titles, snippets of text extracted from those webpages, and hypertext links to those webpages, and may be grouped into a predetermined number of (e.g., ten) search results.

The search engine 112 can also submit a request for advertisements to the system 104. The request may include a number of advertisements desired. This number may depend on the search results, the amount of screen or page space occupied by the search results, the size and shape of the advertisements, etc. The request for advertisements may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., webpages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search engine 112 can combine the search results with one or more of the advertisements provided by the system 104. This combined information can then be forwarded to the user device 108 that requested the content as the page content 111. The search results can be maintained as distinct from the advertisements, so as not to confuse the user between paid advertisements and presumably neutral search results.

In some implementations, the page content 111 can include a webpage 124 with one or more syndication spaces 118, 120, and 122. An example syndication space can include an advertisement slot, an advertisement feed, such as a real time syndication (RSS) feed, or some other portion of a web page 124 in which an advertisement is provided. The syndication spaces 118, 120, 122 can also include advertising products.

The advertisers 102, user devices 108, and/or the search engine 112 can also provide usage information to the advertisement management system 104. This usage information can include measured or observed user behavior related to advertisements that have been served, such as, for example, whether or not a conversion or a selection related to an advertisement has occurred. The system 104 performs financial transactions, such as crediting the publishers 106 and charging the advertisers 102 based on the usage information. Such usage information can also be processed to measure performance metrics, such as a click-through rate ("CTR"), conversion rate, etc.

A click-through can occur, for example, when a user of a user device, selects or "clicks" on a link to a content item returned by the publisher or the advertising management system. The CTR is a performance metric that is obtained by dividing the number of clicks on the content item, e.g., a link to a landing page, an advertisement, or a search result, by the number of times the content item was delivered. For example, if a link to a content item is delivered 100 times, and the content item was clicked on 3 times, then the CTR for that content item is 3%. Other usage information and/or performance metrics can also be used.

A "conversion" occurs, for example, when a user consummates a transaction related to a previously served advertisement. What constitutes a conversion may vary from case to case and can be determined in a variety of ways. For example, a conversion may occur when a user clicks on an advertisement, is referred to the advertiser's webpage, and consummates a purchase there before leaving that webpage. A conversion can also be defined by an advertiser to be any measurable/observable user action such as, for example, downloading a white paper, navigating to at least a given depth of a Webpage, viewing at least a certain number of Webpages, spending at least a predetermined amount of time on a Webpage or Webpages, registering on a Webpage, etc. Other actions that constitute a conversion can also be used.

§2.0 Advertisement Auctioning and Management

In addition to the advertisements being selected based on content such as a search query or webpage content of a publisher, the advertisements can also be selected from an auction. In one implementation, the advertisement management system 104 includes an auction process. Advertisers 102 may be permitted to select, or bid, an amount the advertisers are willing to pay for each presentation, interaction or other action (e.g., click of an advertisement) associated with the presentation of an advertisement. The cost-per-click can include a maximum cost-per-click, e.g., the maximum amount the advertiser is willing to pay for each click of advertisement based on a keyword. For example, advertisers A, B, and C all select, or bid, a maximum cost-per-click of $0.50, $0.75, and $1.00, respectively. The maximum amount advertiser A will pay for a click is $0.50, the maximum amount advertiser B will pay is $0.75, and the maximum amount advertiser C will pay is $1.00.

The rank of an advertisement that is displayed can be determined by, for example, multiplying the maximum cost-per-click for the advertisement by a quality score of the advertisement. The advertisement can then be placed among other advertisements in order of increasing or decreasing rank. For example, suppose the quality score of advertisers A, B, and C are "3," "1," and "1," respectively. The rank of advertiser A, B, and C can be determined as follows:

$A$:Rank=quality score×maximum cost-per-click=3.0× $0.50=1.50

$B$:Rank=quality score×maximum cost-per-click=1.0× $0.75=0.75

$C$:Rank=quality score×maximum cost-per-click=1.0× $1.00=1.00

The advertisers can be ranked as follows:
1. A
2. C
3. B

An advertisement can also be associated with an actual cost-per-click. The actual cost-per-click of the advertisement can be determined by, for example, the maximum cost-per-click of the advertisement, quality score of the advertisement, and by the amount selected or bid by the advertiser directly below. In one implementation, the actual cost-per-click can be the price that is necessary to keep the advertisement's position above the next advertisement. To determine the actual cost-per-click, the system 104 can determine how much the advertiser in position 1 would have to pay to give them a rank equal to the advertiser in position 2, and then the system 104 adds a unit amount, e.g., $0.01, to this determined amount.

To determine how much the advertiser in position 1 would have to pay to give them a rank equal to the advertiser in position 2, the rank of position 2 can be divided by the quality score of position 1 and $0.01 can be added to that amount. The last advertiser in the list can pay a minimum cost-per-click to hold the position in the list. For example, suppose the minimum cost-per-click is $0.20. The actual cost-per-click of advertisers A, B, and C can be determined as follows:

$A$:$C$'s rank/$A$'s quality score=1.0/3=$0.33+ $0.01=$0.34

$C$:$B$'s rank/$C$'s quality score=0.75/1=$0.75+ $0.01=$0.76

$B$:minimum cost-per-click=$0.20

In this example, advertiser A would only have to pay $0.34 to hold the first position in the list of advertisements. C would have to pay $0.76 to hold the second position. Advertiser B would be required to pay the minimum cost-per-click amount of $0.20.

The advertisements, associated usage data, and bidding parameters described above can be stored as advertisement data in an advertisement data store 114. An advertiser 102 can further manage the serving of advertisements by specifying an advertising campaign. The advertising campaign can be stored in campaign data in an advertisement data store 114, which can, for example, specify advertising budgets for advertisements, when, where and under what conditions particular advertisements may be served for presentation, etc.

§3.0 Displaying Syndication Spaces

As can be appreciated from the foregoing, the advertising management system 104 permits the serving of advertisements targeted to documents, e.g., the webpage 124, served by a publisher 106. An advertiser 102 or a publisher 106 may be interested in reviewing the syndication spaces 118, 120 and 122, e.g., advertising slots, on various web properties to evaluate the syndication spaces and/or the web property. One technique for allowing the advertiser 102 to review the locations is to allow the advertiser 102 to see a visual display of the syndication spaces 118, 120 and 122 that are available on the publisher's webpage as well as the attributes associated with each syndication space 118, 120 and 122. Attributes are discussed further below.

In one implementation, a property analysis subsystem 116 can identify the syndication spaces 118, 120 and 122 associated with a web property, such as the webpage 124. Each syndication space 118, 120 and 122 defines a location on the webpage 124 in which the advertiser 102 can place an advertisement, e.g. advertisements 117, 119 and 121. The webpage 124 can be associated with the publisher 106. Thus, syndication spaces 118, 120 and 122 define the locations on the webpage of the publisher 106 that the publisher 106 has reserved for advertisements.

In some implementations, the publisher 106 associated with the webpage 124 can provide the syndication spaces 118, 120, 122 to the property analysis subsystem 116. For example, the publisher 106 can design the webpage 124 and insert snippets, e.g., JavaScript, to define locations at which advertisements are to be rendered and to implement requests for advertisements the advertisement management system 104.

In some implementations, each syndication space 118, 120 and 122 can be associated with one or more attributes. The attributes can, for example, include a name of the syndication space 118, 120, 122. The name can be one that the publisher 106 has selected. The name can, for example, describe the location on the publisher's webpage, e.g., "Banner" or "Leaderboard."

The attributes can also include a price associated with advertising in the location associated with the syndication space 118, 120 and 122. The price can, for example, include the minimum CPC that an advertiser would have to bid in order to be eligible to enter the auction for the webpage 124 and for the particular syndication space. For example, each of the advertisements already displayed on the webpage 124 can have a cost-per-click amount of at least $0.50. Therefore, in order to enter the auction for the webpage 124, an advertiser would have to bid at least $0.50. Accordingly, the price attribute can include this minimum CPC.

The attributes can also include a format for the syndication space 118, 120, 122. Each syndication space 118, 120 and 122 can accept a certain format to be displayed on the webpage 124. For example, the format can include one or more image, video, or audio formats such as TIFF, .bmp, .JPG, .gif, .wav, .mp3, mpeg, etc. Each syndication space 118, 120 and 122 may only be compatible with a certain format.

The attributes can also include an availability of each syndication space 118, 120 and 122. The availability indicates whether the syndication space is available to accept new advertisements. For example, the syndication space 118 may already be associated with five advertisements, and therefore, no other advertisement can be placed in the location associated with the syndication space 118 until one of the five advertisements expires. Each advertisement, however, will only be displayed in the location associated with the syndication space 118 for a certain time period. Therefore, the availability can indicate the date that one of the current advertisements expires.

The above example list of attributes is not exhaustive. Other attributes can also be specified and/or used.

When the webpage 124 and advertisements 117, 119 and 121 are provided to the user device 108a, the webpage 124 is rendered and displayed on the user device 108a. Similar to the syndication spaces 118, 120 and 122, the advertisements 117, 119 and 121 can also be associated with attributes. Example attributes include the length of time the advertisement will be displayed, the name of the advertiser, a creative associated with the advertisement, and a minimum CPC associated with the advertisement.

In some implementations, the property analysis subsystem 116 can generate display data 126 that cause each syndication space 118, 120 and 122 to selectively display a visual indication 128 of one or more of the attributes on the webpage 124 at the client device. The visual indication 128 can include highlighting the locations on the webpage 124 associated with each syndication space 118, 120 and 122. The visual indication 128 can also include outlining a border of each location associated with the syndication space 118, 120 and 122 so that the location is clearly visible and stands out from the other portions of the webpage 124. In some implementations, the visual indication 128 can include textual data specifying and describing a normally non-visible attribute, such as a minimum price associated with the syndication space, or a format specification associated with the syndication space, etc.

In some implementations, the visual indication 128 can be cumulative of advertisements displayed in the location of each syndication space 118, 120 and 122 when the webpage 124 is rendered at the client device. For example, the visual indication 128 can be overlaid on top of existing advertisements, where the existing advertisements may be still visible from underneath the visual indication 128. The visual indication 128 can, for example, show the advertiser 102 the various syndication spaces 118, 120 and 122 and associated attributes that are available on the webpage 124 for advertising opportunities.

In some implementations, the visual indication 128 is exclusive of any advertisement displayed in each syndication space 118, 120 and 122 when the webpage 124 is rendered at the client device. For example, the existing advertisement may be suppresses or not displayed, and the visual indication 128 can display the various syndication spaces 118, 120, 122 and associated attributes that are available on the webpage 124 for advertising opportunities.

In some implementations, the display data 126 can cause a client device to display a display element 130 on the webpage 124. In some implementations, the display element 130 can, for example, include a button on the webpage 124. In other implementations, the display element 130 can be a button on a toolbar on the webpage 124. For example, the advertiser 102 can install the toolbar and when browsing the webpage 124, can press a button on the toolbar to display the visual indication 128. The display data 126 can be provided to advertisers 102 or publishers 106 upon creating an account managed by the advertisement management system 104.

Selection of the display element 130 on the webpage 124 can generate the visual indication 128 of the attributes of each syndication space 118, 120 and 122 displayed on the webpage 124. For example, upon selection of the display element 130, each location associated with the syndication spaces 118, 120 and 122 can be highlighted to show the advertiser 102 the various locations on the webpage 124 available for advertising. Other attributes such as the name associated with each syndication space 118, 120 and 122 can also be displayed for the advertiser 102 as well as the minimum CPC, the format, and the availability associated with each syndication space 118, 120, and 122.

In some implementations, one of the attributes can include an option to enter the auction for a corresponding syndication space 118, 120, and 122. The attribute can, for example, include a contractual attribute. Therefore, an advertiser 102 can submit all the advertisement information associated with entering the auction from the webpage 124. Upon selection of the contractual attribute, an attribute interface can be displayed in response to the user selection. The attribute interface can be used to receive the attribute input data.

In some implementations, the attribute input data can include a creative associated with a new advertisement submitted to the advertisement management system 104. The creative can include one or more lines of text describing the advertisement. The attribute input data can also include a maximum bid associated with the advertisement. The maximum bid is the maximum amount the advertiser 102 will pay for a click on the advertisement. The attribute input data can also include a number of impressions the advertiser 102 is going to purchase, e.g., a maximum number of impressions the advertiser 102 will purchase.

The attribute input data can also be keywords associated with the advertisement. The keywords are terms that the advertiser 102 associates with the advertisement so that a query including the keywords will return the advertisement.

The attribute input data can also include a start day and an end day to associate with the advertisement. If, for example, the advertisement is selected as one of the advertisements to display on the webpage 124, then the advertisement will be displayed on the webpage 124 only during the time period specified by the start day and end day.

The attribute input data can also include one or more images selected by the advertiser 102 to associate with the advertisement. The image can, for example, be the same format as indicated in the attributes 222, 226, 230. In some implementations, if one of the images is not the same format as indicated in the attributes 222, 226, 230, depending on the syndication space selected for advertising by the advertiser, the interface can provide an error message when the advertiser 102 uploads the incorrect format for the image.

In some implementations, once the attribute input data is received, the property analysis subsystem 116 can generate advertisement display data that causes the creative to be displayed at the client device in the location on the webpage 124. The creative can be displayed in the location associated with the selected syndication space along with the image, if one has been provided.

§4.0 Example Syndication Spaces

Figure 2A:
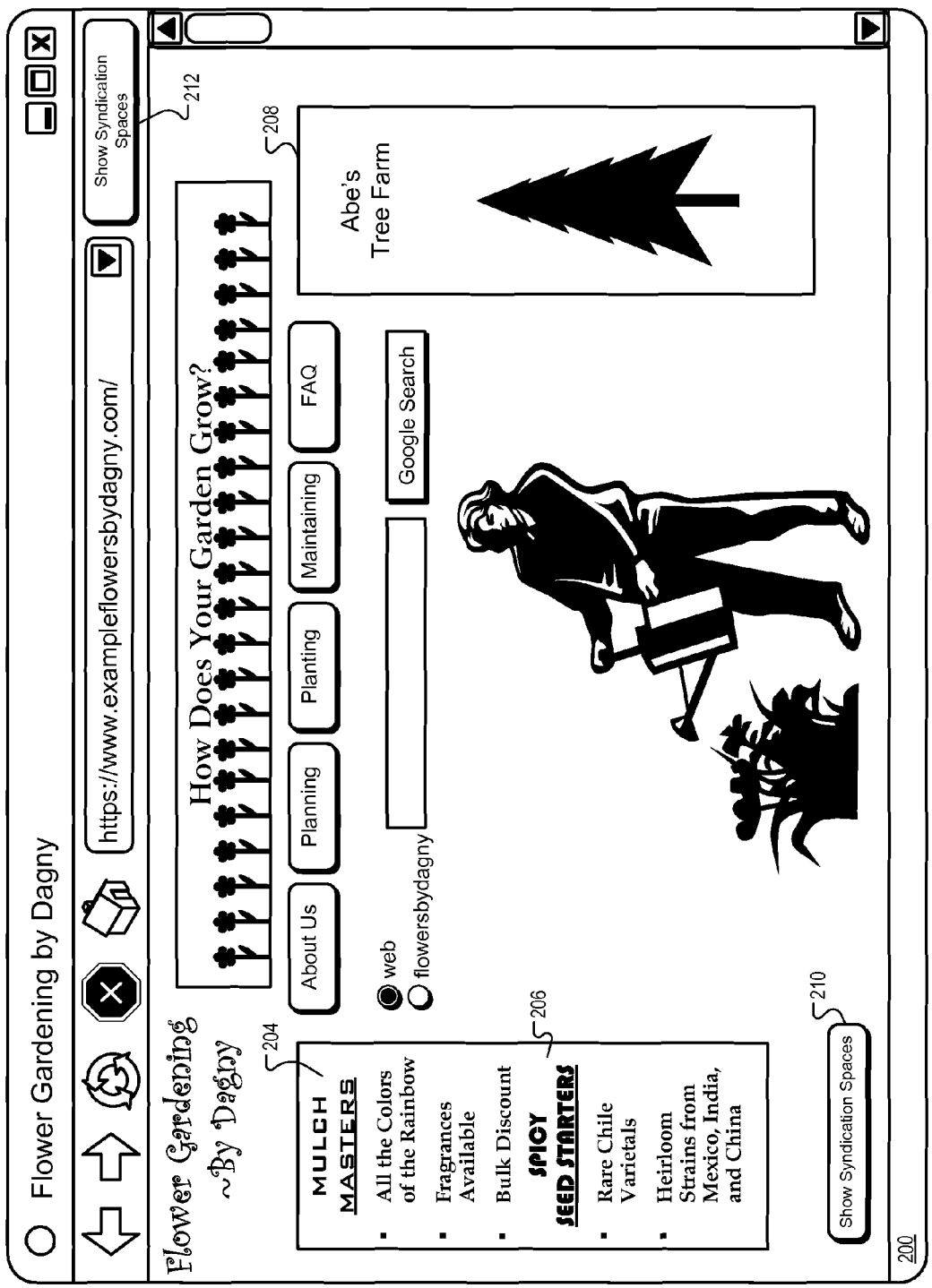
FIG. 2A is an example publisher webpage with one or more syndication spaces.

FIG. 2A illustrates an example webpage 200 of a publisher 106. The publisher 106 in this example is "Flower Gardening by Dagny." The webpage 200 shows one or more advertisements 204, 206, 208. An advertiser 102 browsing the webpage 200 may decide to advertise on the webpage 200. In some implementations, a "Show Syndication Spaces" button 210 can be rendered on the web page 200. The advertiser 102 can select the "Show Syndication Spaces" button 210 to review a display of the syndication spaces available on the webpage 200 for placing an advertisement. In other implementations, a "Show Syndication Spaces" 212 button can be displayed on a toolbar of the web page. The advertiser 102 can select the "Show Syndication Spaces" button 212 on the toolbar to see a display of the syndication spaces. The advertiser 102 can create an account with the management system 104 to view the buttons 210 and 212, along with the corresponding functionality.

Figure 2B:
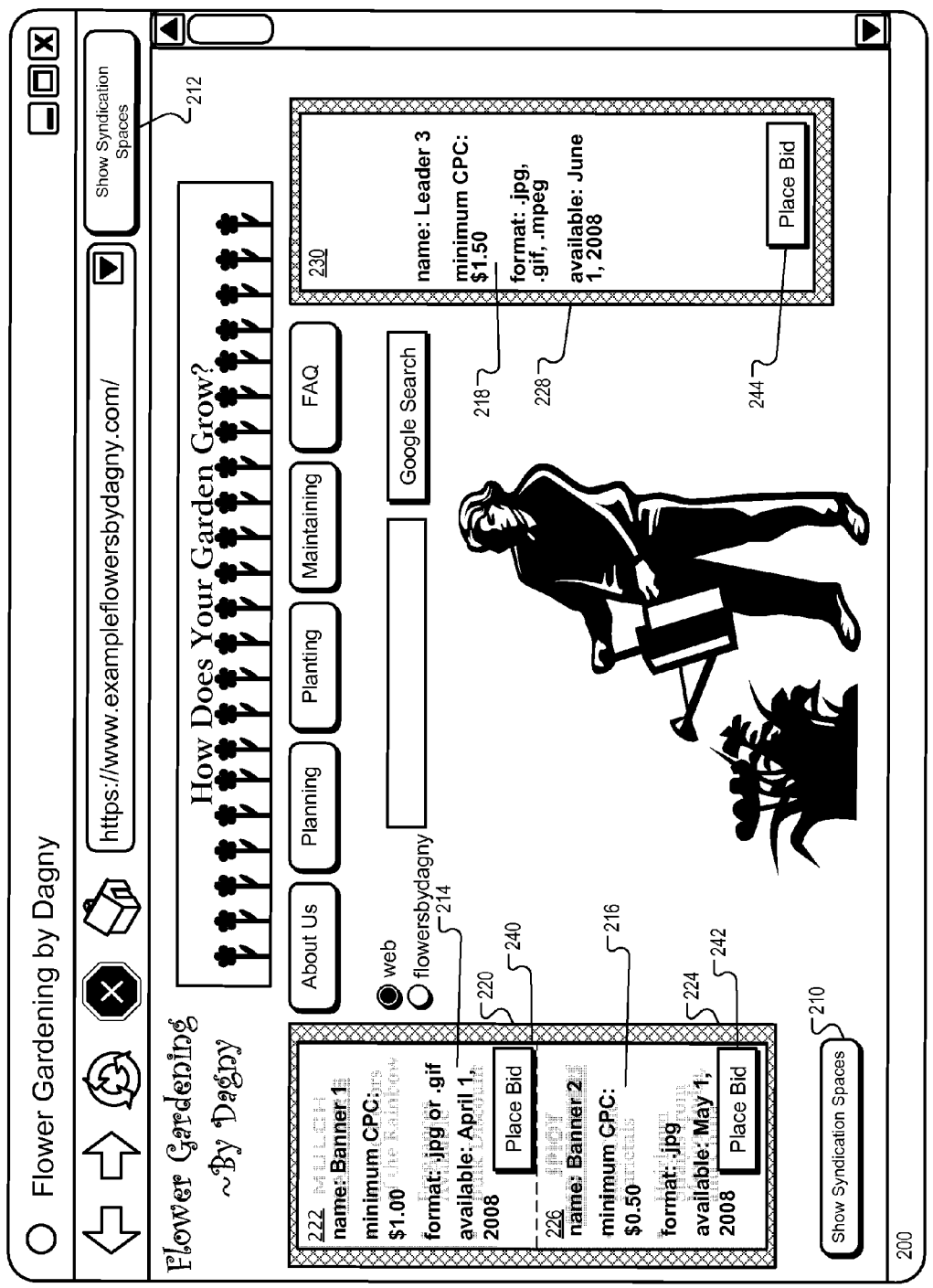
FIG. 2B is another example publisher webpage with one or more syndication spaces.

FIG. 2B illustrates an example webpage 200 displaying one or more syndication spaces 214, 216, 218. Upon selection of the "Show Syndication Spaces" button 210 or 212, the webpage 200 can display a visual indication of the attributes 222 associated with the syndication space 214. The webpage 200 can also display a visual indication of the attributes 226 associated with the syndication space 216, as well as visual indications of the attributes 230 associated with the syndication space 218.

The visual indications can, for example, include highlights 220, 224, 228 around each advertising location associated with the syndication spaces 214, 216 and 218, respectively, that are available for advertising on the webpage 200, and can also include textual rendering of the attributes 222, 226, and 230 associated with the syndication spaces 214, 216, 218 such as the name, minimum CPC, format, and availability date of each syndication space 214, 216, 218. For example, the textual rendering of the attributes 222 include the name of the syndication space 214, ("Banner 1);" the minimum CPC that an advertiser 102 must bid to enter the auction to advertise in the location associated with syndication space 214 ("$1.00"); the format that an advertiser 102 must provide to advertise in the location associated with syndication space 214 (".jpg" or ".gif."); the date the syndication space 214 is available for advertising ("Apr. 1, 2008"). Similar attributes are shown by the visual indicators 224 and 228 for syndication spaces 226 and 230, respectively.

The visual indicators 220, 222, 224 and 226 are cumulatively displayed over the respective advertisements 204 and 206. In this example, the webpage 200 thus displays the visual indications 220, 222, 224 and 226 on top of previously displayed advertisements 204 and 206. However, the advertisement 208 is not shown in FIG. 2B, as the visual indicators 228 and 230 are exclusively displayed.

In some implementations, one of the attributes 222, 226, and 230 can include a contractual attribute, such as a place bid attribute 240, 242 and 244. An advertiser can submit the advertisement information associated with entering the auction by clicking on the place bid attribute 240, 242, and 244. Upon selection of the place bid attribute 240, 242 or 244, an attribute interface can be displayed, as shown in FIG. 2C.

Figure 2C:
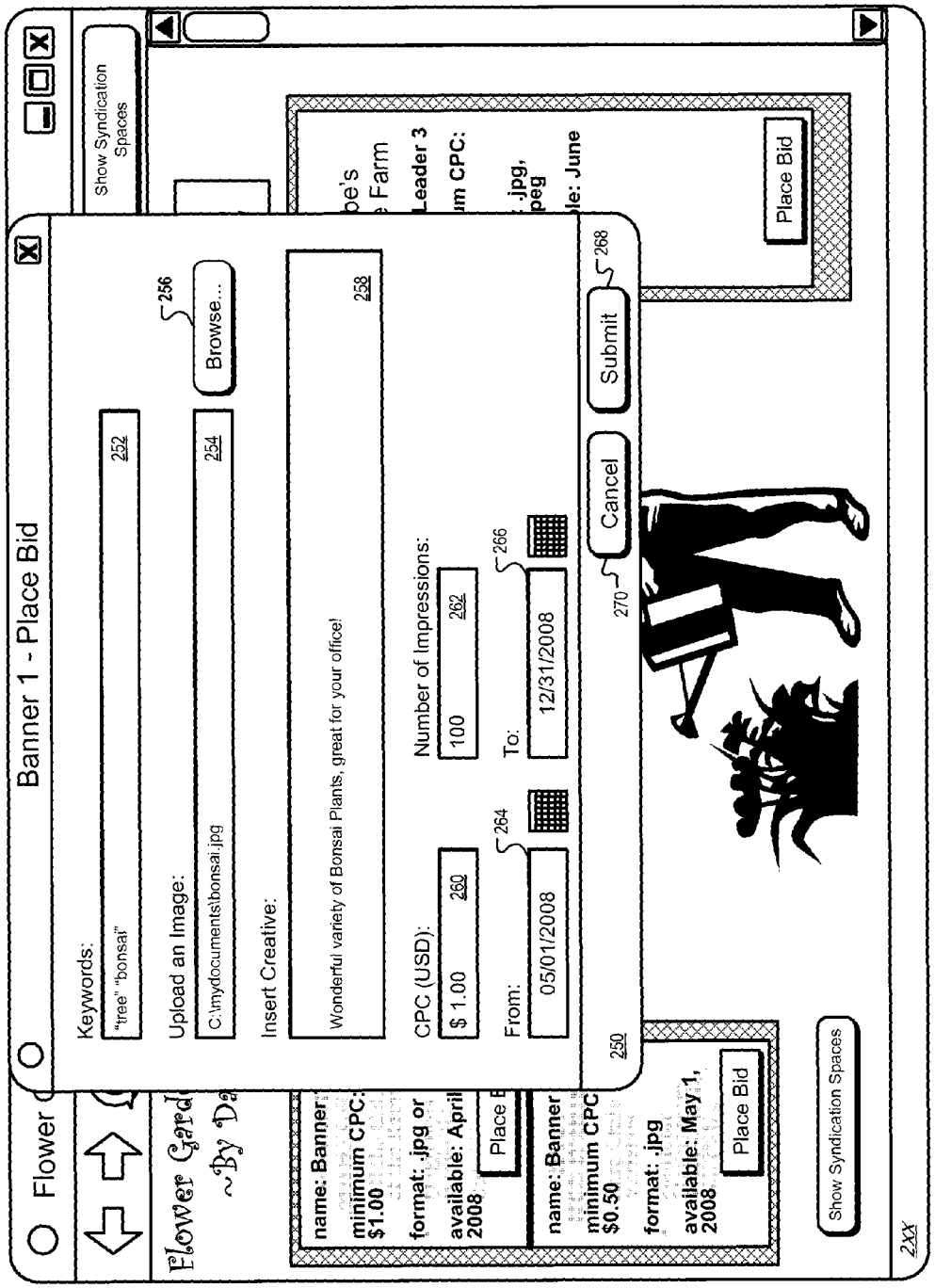
FIG. 2C is another example publisher webpage with one or more syndication spaces.

FIG. 2C illustrates an example webpage 200 of a publisher 106 with an attribute interface 250. The attribute interface 250 has been rendered in response to the "Place Bid" attribute 242 associated with syndication space 216. The attribute interface 250 can be used to receive the attribute input data associated with the advertisement. For example, the attribute interface 250 can include an area 252 for the advertise 102 to submit keywords ("tree," and "bonsai"). The attribute interface 250 can also include an area 254 for the advertiser 102 to upload an image associated with the advertisement ("c:\mydocuments\bonsai.jpg"). The advertiser 102 can, for example, user a browser button 256 associated with the interface 250 to upload the image 254.

The attribute interface 250 can also include an area 258 for the advertiser 102 to enter the creative associated with the advertiser ("Wonderful variety of Bonsai Plants, great for your office!"). The attribute interface can include an area 260 for the advertiser 102 to specify the max CPC associated with the each click on the advertisement ("$1.00") as well as an area 262 to specify the number of impressions the advertiser 102 wants to purchase ("100").

The interface 250 can also include an area 264 to specify a start date for the advertisement if it wins the auction to an end date 266. In one implementation, the start date can be automatically filled with the available date associated with the syndication space. For example, the start date can be automatically filled with "May 1, 2008" because the syndication space 216 is associated with an available date of "May 1, 2008."

By selecting "submit" 268, the advertiser 102 can submit the advertisement to the auction for the syndication space 216. The advertiser 102 can also click on a "cancel" button 270 to cancel entering into the auction.

In some implementations, an advertiser who has previously used this system, and or placed advertising on this publisher's website, may have a creative library of content to choose from. This could be represented on the webpage 124 as an option in addition to selecting a creative file from the local machine. The advertiser 102 can select a creative stored in the creative library.

In some implementations, the advertiser 102 can drag and drop a creative from the operating system. Therefore, instead of typing in the creative into the interface 250, the advertiser 102 can drag and drop an already created creative into the interface 250.

In some implementations, payment can be made through the interface 250. For example, a check out screen can be displayed upon selection of submit 268 button, and the advertiser 102 can pay for the advertisement from the payment screen.

§5.0 Example Syndication Space Processes

Figure 3:
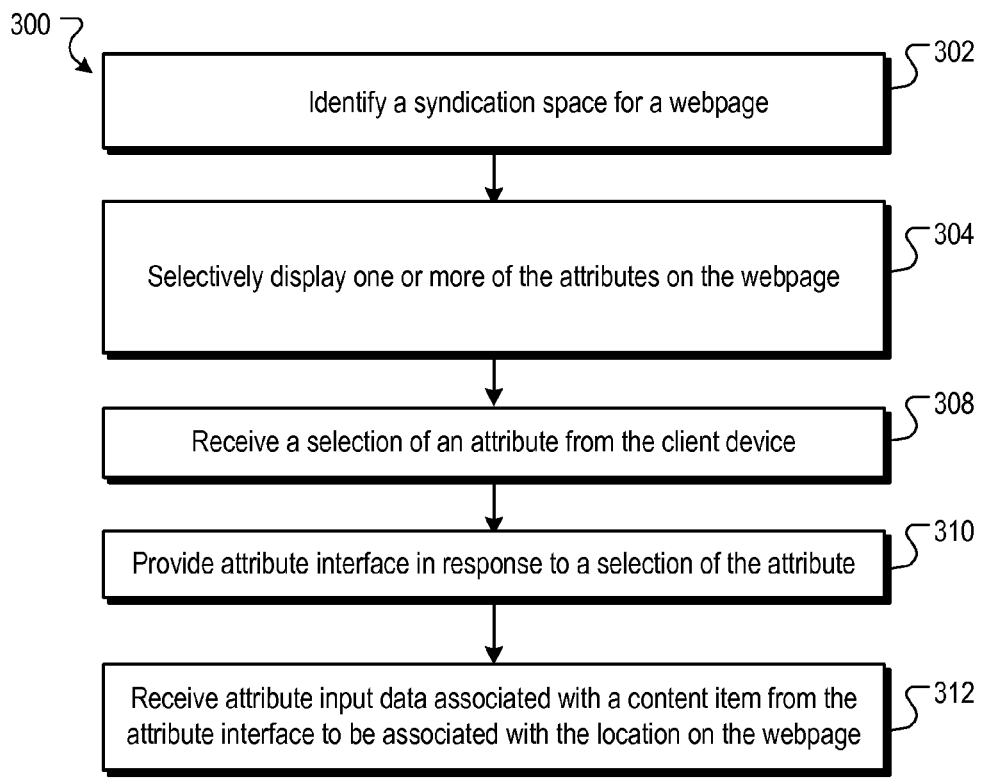
FIG. 3 is a flow diagram of an example process for receiving attribute input data associated with syndication spaces.

FIG. 3 is a flow diagram of an example process 300 for receiving attribute input data associated with syndication spaces. The process 300 can, for example, be implemented in the advertisement management system 104 of FIG. 1, or in some other hardware and software computing device.

The process 300 identifies a syndication space for a webpage (302). The syndication space can define a location on the webpage in which one or more content items, e.g., advertisements, are displayed. The syndication space can be associated with one or more attributes. For example, the property analysis subsystem 116 can identify a syndication space for a webpage as described in sections 3.0 and 4.0 above.

The process 300 selectively displays one or more of the attributes on the webpage at a client device (304). For example, the property analysis subsystem 116 can selectively display one or more of the attributes on the webpage at a client device.

The process 300 receives a selection of an attribute from the client device (306). For example, the property analysis subsystem 116 can receive a selection of an attribute from the user device 108a.

The process 300 provides an attribute interface in response to a selection of the attribute (308). For example, the property analysis subsystem 116 can provide an attribute interface in response to a selection of the attribute.

The process 300 receives attribute input data associated with a content item from the attribute interface to be associated with the location on the webpage (312). For example, the property analysis subsystem 116 can receive attribute input data associated with the content item from the attribute interface to be associated with the location on the webpage.

Figure 4:
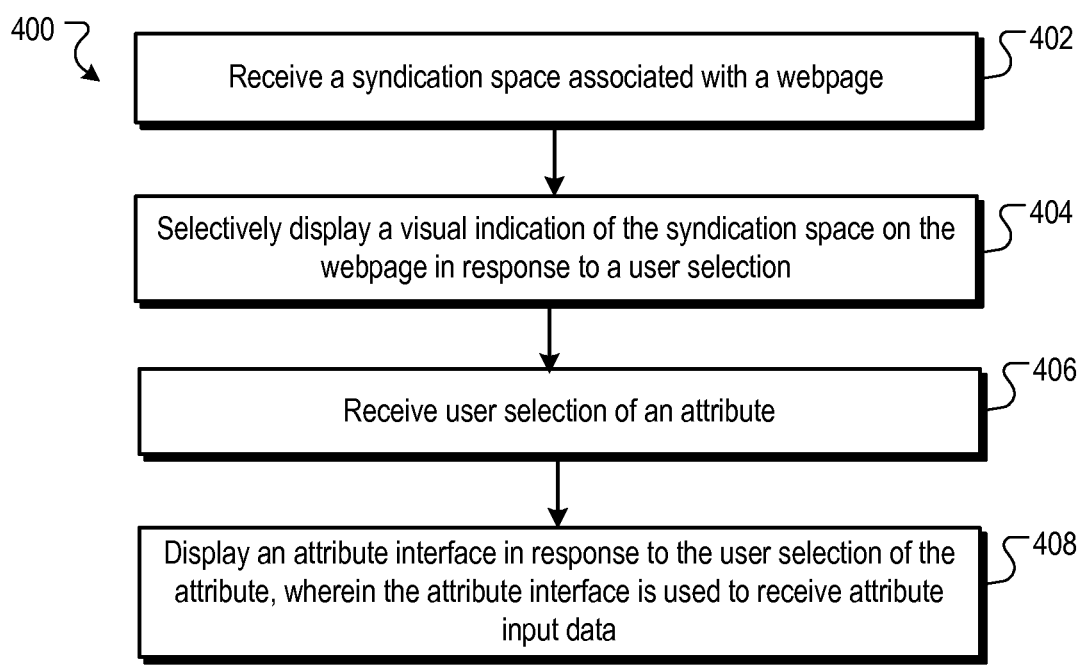
FIG. 4 is a flow diagram of an example process for displaying an attribute interface to receive attribute input data.

FIG. 4 is a flow diagram of an example process 400 for displaying an attribute interface to receive attribute input data. The process 400 can, for example, be implemented in a client device, such as the user device 108a FIG. 1, or in some other hardware and software computing device.

The process 400 receives an identifier of a syndication space associated with a webpage (402). The syndication space can define a location on the webpage in which one or more content items, e.g., advertisements, are displayed on the client device, and wherein the syndication space is associated with one or more attributes. For example, the user device 108a can receive an identifier of a syndication space associated with the webpage 124, e.g., syndication space 118.

The process 400 selectively displays a visual indication of the one or more attributes on the webpage in response to a user selection (404). For example, a user of the user device 108a can select the display element 130, which, in turn, causes the client device to display visual indications of the one or more attributes.

The process 400 receives user selection of the attribute (406). For example, the user device 108a can receive user selection of the attribute.

The process 400 receives attribute input data associated with a content item from the attribute interface to be associated with the location on the webpage, wherein the attribute interface is used to receive attribute input data (408). The user device 108a can receive attribute input data associated with a content item from the attribute interface to be associated with the location on the webpage 124, wherein the attribute interface is used to receive attribute input data.

The advertisement management system 104 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. The advertisement management system 104 can be distributively implemented over a network, such as a server farm, or can be implemented in a single computer device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   identifying a syndication space incorporated in a webpage displayed on a client device, the syndication space defining a location on the webpage in which one or more content items are displayed on the client device, and the syndication space being associated with one or more pricing attributes, wherein presentation of content items in the syndication space is managed by an advertisement management system;
   providing, to a client device associated with an account managed by the advertisement management system, data for:
      suppressing display of a content item in the syndication space; and
      displaying one or more of the one or more pricing attributes of the syndication space in the syndication space instead of the suppressed content item;
   receiving a selection of a pricing attribute of the one or more pricing attributes displayed in the syndication space;
   providing an attribute interface to the client device in response to the selection of the pricing attribute displayed in the syndication space; and
   receiving attribute input data associated with a content item, from the attribute interface, the content item associated with the attribute input data to be displayed in the syndication space.

2. The method of claim 1, wherein the content item associated with the attribute input data is an advertisement.

3. The method of claim 2, wherein display data causes the client device to display a display element and causes the client device to display a visual indication of the one or more pricing attributes in the syndication space displayed on the webpage in response to a selection of the display element.

4. The method of claim 2, wherein the attribute input data includes a maximum bid associated with the advertisement.

5. A method, comprising:
   receiving an identifier of a syndication space incorporated in a webpage displayed on a client device, the syndication space defining a location on the webpage in which one or more content items are displayed on the client device, wherein the syndication space is associated with one or more pricing attributes, and wherein presentation of content items in the syndication space is managed by an advertisement management system;
   providing, to a client device associated with an account managed by the advertisement management system, data for:
      suppressing display of a content item in the syndication space; and
      displaying a visual indication of a pricing attribute of the one or more pricing attributes in the syndication space instead of the suppressed content item in response to a user selection;
   receiving a user selection of the pricing attribute displayed in the syndication space; and
   displaying an attribute interface in response to the user selection of the pricing attribute displayed in the syndication space, wherein the attribute interface is used to receive attribute input data.

6. The method of claim 5, wherein the attribute input data is associated with a content item that is an advertisement.

7. The method of claim 6, further comprising:
   receiving the user selection of a display element associated with the webpage; and
   selectively displaying the visual indication in response to the received user selection.

8. The method of claim 6, wherein the attribute input data includes a maximum bid associated with the advertisement.

9. A system, comprising:
   a processor; and
   a computer-readable medium coupled to the processor and having instructions stored thereon, which, when executed by the processor, cause the processor to perform operations comprising:
      identifying a syndication space incorporated in a webpage displayed on a client device, the syndication space defining a location on the webpage in which one or more content items are displayed on the client device, and the syndication space being associated with one or more pricing attributes, wherein presentation of content items in the syndication space is managed by an advertisement management system;
      providing data, to a client device associated with an account managed by the advertisement management system, for displaying one or more of the one or more pricing attributes of the syndication space in the syndication space instead of a content item;

receiving a selection of a pricing attribute of the one or more pricing attributes displayed in the syndication space;

providing an attribute interface to the client device in response to the selection of the pricing attribute displayed in the syndication space; and receiving attribute input data associated with a content item, from the attribute interface, the content item associated with the attribute input data to be displayed in the syndication space.

10. The system of claim 9, wherein the content item associated with the attribute input data is an advertisement.

11. The system of claim 9, wherein display data causes the client device to display a display element and causes the client device to display a visual indication on the webpage in response to a selection of the display element.

12. The system of claim 10, wherein the attribute input data includes a maximum bid associated with the advertisement.

13. The system of claim 12, wherein the processor is further operable to perform operations comprising:

generating advertisement display data that causes a creative to be displayed at the client device in the location on the webpage.

14. A system, comprising:

a processor; and a computer-readable medium coupled to the processor and having instructions stored thereon, which, when executed by the processor, cause the processor to perform operations comprising:

receiving an identifier of a syndication space incorporated in a webpage displayed on a client device, the syndication space defining a location on the webpage in which one or more content items are displayed on the client device, and wherein the syndication space is associated with one or more pricing attributes, and presentation of content items in the syndication space is managed by an advertisement management system;

providing, to a client device associated with an account managed by the advertisement management system, data for:

suppressing display of a content item in the syndication space; and displaying a visual indication of a pricing attribute of the one or more pricing attributes in the syndication space instead of the suppressed content item in response to a user selection;

receiving a user selection of the pricing attribute displayed in the syndication space; and displaying an attribute interface in response to the user selection of the pricing attribute displayed in the syndication space, wherein the attribute interface is used to receive attribute input data.

15. The system of claim 14, wherein the attribute input data is associated with a content item that is an advertisement.

16. The system of claim 15, wherein the attribute input data includes a maximum bid associated with the advertisement.

17. A non-transitory computer storage medium encoded with computer program instructions that when executed by one or more computers cause the one or more computers to perform operations comprising:

identifying a syndication space incorporated in a webpage displayed on a client device, the syndication space defining a location on the webpage in which one or more content items are displayed on the client device, and the syndication space being associated with one or more pricing attributes wherein presentation of content items in the syndication space is managed by an advertisement management system;

providing data, to a client device associated with an account managed by the advertisement management system, for displaying one or more of the one or more pricing attributes of the syndication space in the syndication space instead of a content item;

receiving a selection of a pricing attribute of the one or more pricing attributes displayed in the syndication space;

providing an attribute interface to the client device in response to the selection of the pricing attribute displayed in the syndication space; and receiving attribute input data associated with a content item, from the attribute interface, the content item associated with the attribute input data to be displayed in the syndication space.

18. A non-transitory computer storage medium encoded with computer program instructions that when executed by one or more computers cause the one or more computers to perform operations comprising:

receiving an identifier of a syndication space incorporated in a webpage displayed on a client device, the syndication space defining a location on the webpage in which one or more content items are displayed on the client device, and wherein the syndication space is associated with one or more pricing attributes, and presentation of content items in the syndication space is managed by an advertisement management system;

providing, to a client device associated with an account managed by the advertisement management system, data for:

suppressing display of a displayed content item in the syndication space; and displaying a visual indication of a pricing attribute of the one or more pricing attributes in the syndication space instead of the suppressed content item in response to a user selection;

receiving a user selection of the pricing attribute displayed in the syndication space; and displaying an attribute interface in response to the user selection of the pricing attribute displayed in the syndication space, wherein the attribute interface is used to receive attribute input data.

* * * * *